Patented July 6, 1954

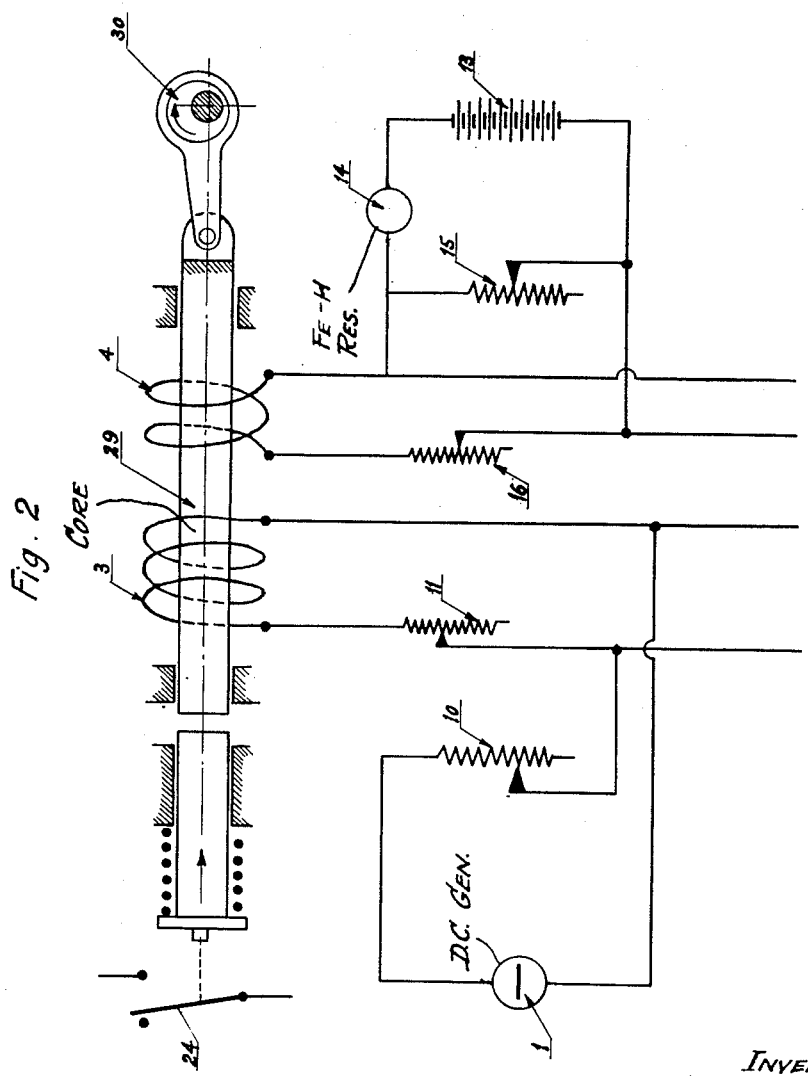

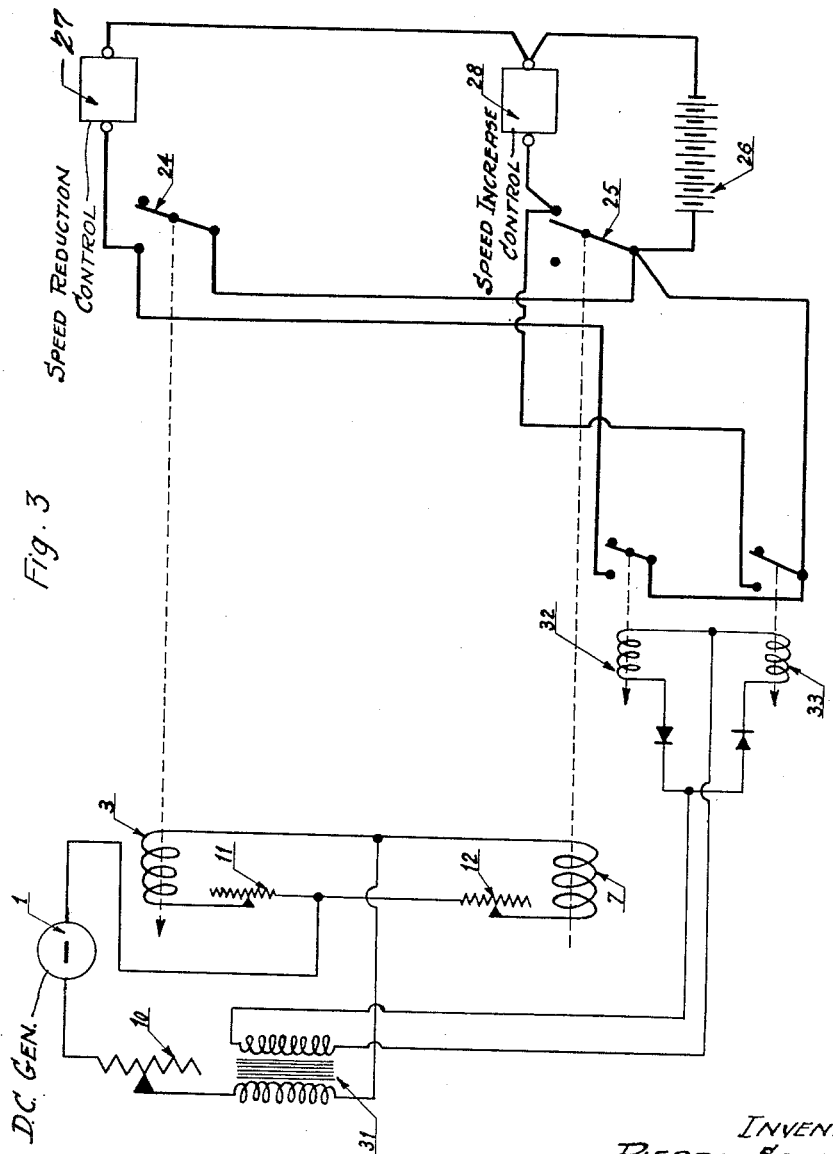

2,683,244

UNITED STATES PATENT OFFICE 2,683,244

ANTIHUNT SPEED REGULATOR

Pierre Salaun, Choisy-le-Roi, and Pierre Lyonnet, Paris, France

Application July 12, 1951, Serial No. 236,314

4 Claims. (Cl. 317—5)

The present invention has as an object improvements in or relating to regulators, and particularly speed regulators, with a view to giving them a high sensitivity and fidelity and preventing the generation of steady oscillations or even of damped oscillations about the adjustment value.

The invention concerns, more particularly, regulators utilizing a direct current source, the voltage of which is a function of the value of the quantity to be regulated.

Only the case of speed regulators will be considered in the present specification, but it should be understood that the present invention can be applied to other quantities to be regulated without affecting the general scope of the invention.

The regulator according to the present invention makes it possible to keep a quantity constant, particularly the speed of rotation of an element. This regulator comprises a measuring device of the quantity to be regulated, constituting an electric current source the voltage of which is substantially proportional to the quantity; a first and a second electromagnetic relay, each having an excitation winding supplied from the said current source for giving rise to a flux in their magnetic circuits; a first set of electrical contacts which, when operating, energizes a first electric control capable of decreasing the value of said quantity and the operation of which is caused by the first relay when the flux through its magnetic circuit exceeds a certain value; a second set of electrical contacts which, when, operating, energizes a second electrical control capable of increasing the value of said quantity, and the operation of which is caused by the second relay when the flux through its magnetic circuit becomes less than a certain value.

This regulator is chiefly characterized by the fact that each relay comprises a device which is mounted on its magnetic circuit and which is so designed as to effect in the flux through said magnetic circuit a periodic modification, this modification varying from zero to a maximum value which is so determined that the influence of the measuring device on the relay cannot then give rise to a flux causing its operation when the quantity to be regulated undergoes a variation smaller than a predetermined value.

In the drawing:

Figure 2 shows a detail of a modification of this type of embodiment; and

Fig. 3 shows an improvement in this type of embodiment.

Figure 1:
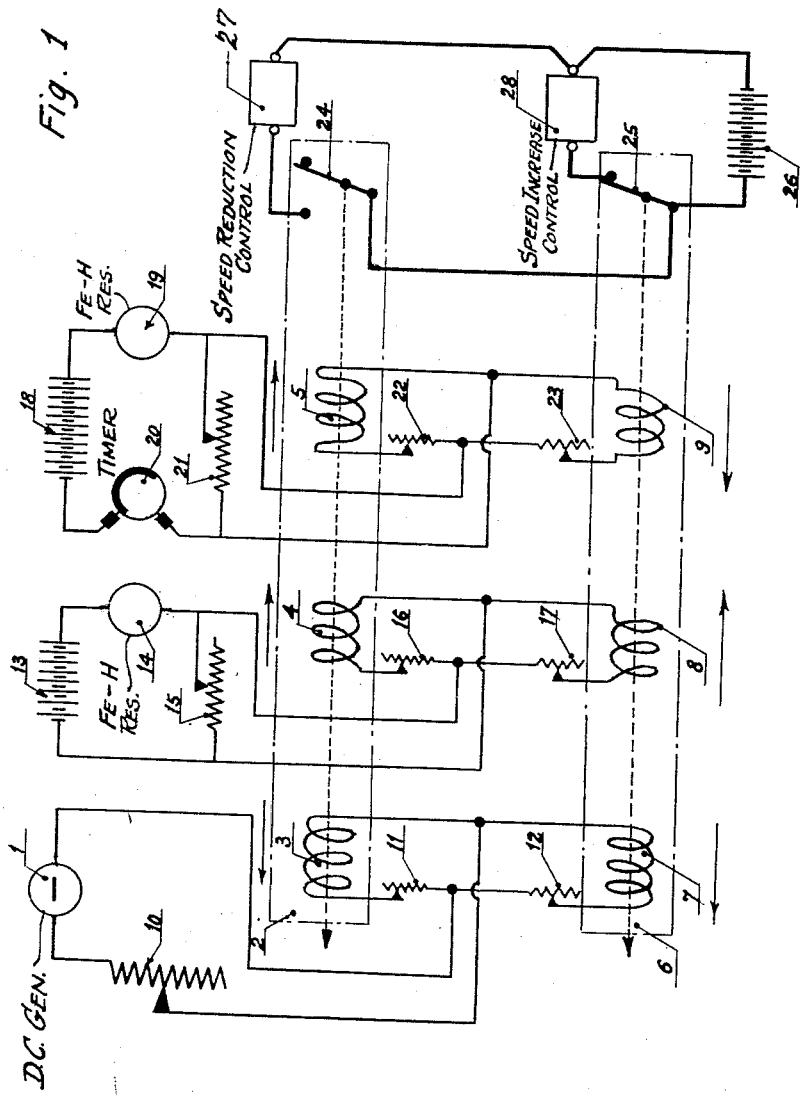
Figure 1 shows the electrical mounting of a speed regulator built in accordance with the invention.

The regulator shown in Figure 1 is a speed regulator or governor designed for keeping to a constant steady state value the speed of a rotating element. The measuring device for that speed consists of an electric current generator driven by the rotating element. This generator generates a voltage which is substantially proportional to said speed and acts on the relays 2 and 6 which, upon operating, actuate, respectively, an electric control 27 and an electric control 28. These controls, in turn, act on the motion of the element during their interventions, the one for increasing the speed, the other one for decreasing it.

The relay 2 comprises three windings, 3, 4 and 5 mounted on the same magnetic circuit. The winding 3 is supplied from the generator 1. It constitutes the excitation winding and the magneto-motive force it generates is substantially proportional to the speed to be regulated. The winding 4 is a differential winding energized by a constant value direct current for generating a magneto-motive force in a direction opposite that of the winding 3. The winding 5 is an auxiliary winding. It is fed a periodic, constant voltage current and generates a magneto-motive force in a direction opposite that of the winding 3.

Similarly, the relay 6 comprises three windings 7, 8 and 9 mounted on the same magnetic circuit. The winding 7 is supplied from the generator 1 for constituting an excitation winding, with a magneto-motive force substantially proportional to the speed to be regulated. The winding 8 is a differential winding supplied with a constant direct current for generating a magneto-motive force opposite that of the winding 7. The winding 9 is an auxiliary winding. It is fed a constant voltage periodic current and generates a magneto-motive force in the same direction as that of the winding 7.

The windings 3 and 7 are mounted in parallel and are energized by the generator 1 through an adjustable resistance 10, the value of which will determine the value of the voltage actuating the relays and, therefore, the steady state speed maintained. Adjusting resistance 11 and 12 make it possible to adjust the voltages across the coils with respect to each other.

The windings 4 and 8 are also mounted in parallel. They are energized by a direct current source 13 through a current regulating element 14, such as an iron-hydrogen lamp, keeping the value of the current delivered constant. A resistance 15, connected in shunt, makes it possible to adjust the value of the current through the windings 4 and 8. Adjustment resistances 16 and 17 make it possible to adjust the voltage across the windings with respect to one another.

The windings 5 and 9 are also mounted in parallel and are supplied from a direct current source 18 (this source may be the same as source 13). The power supply is effected through a current regulating element 19, such as an iron-hydrogen lamp, keeping the value of the current delivered constant and, through a rotating interrupter 20, or any other mechanical or electromagnetic device, making it possible to cut this power supply in and out at regular intervals. An adjustment resistance 21, connected in shunt makes it possible to adjust the value of the current delivered to the coils 5 and 9. Adjustment resistances 22 and 23 make it possible to adjust the voltages across the windings with respect to one another.

The magneto-motive forces of the windings 3 and 4 of the relay 2 are so adjusted that their resistance causes the closing of an electric contact 24 controlled by the armature of said relay when the speed to be regulated exceeds the steady state value to be maintained, and when the winding 5 has no effect due to the switch 20 being opened.

The electro-motive forces of the windings 7 and 8 of the relay 6 are adjusted, on the one hand, so that their resultant causes the closing of an electric contact 25 when the speed to be regulated drops below said steady state value to be maintained, and when the winding 9 is ineffective due to the opening of the switch 20.

This closing of the electric contacts 24 and 25 is for the purpose of supplying, by means of a current source 26, either an electric control 27 causing a decrease in the driven speed of the element to be regulated, or an electric control 28 causing a speed increase. These controls 27 and 28 can act on the rotation motion of the element by any known means which are not part of the invention, for instance, by an action on the power supply of the driving motor, by an action on a speed reducer, or, when it is desired to regulate the speed of a propeller, by means of pitch increasing or decreasing devices.

The actions of the windings 3 and 4 and of the windings 7 and 8 are thus adjusted to actuate the relay 2 or the relay 6, when the speed is higher or lower than the speed to be maintained, so that the controls 27 and 28 bring back this value to the desired figure. As stated above, this may result in a production of oscillations about the speed value to be maintained.

In accordance with the present invention, the auxiliary winding 5 of the relay 2, when energized, generates a magneto-motive force opposite, in direction, to the magneto-motive force in the winding 3 and consequently to the resultant of the magneto-motive forces in the windings 3 and 4 within the limits of the utilization of the regulator. The flux through the magnetic circuit of this relay will thus be decreased during the closure of the switch 20 and the relay will stop operating even when the speed exceeds the value to be maintained. The oscillations which were to be feared are thus interrupted. The opposing magneto-motive force in the winding 5, however, will be insufficient, according to the invention, for opposing the actuation of the relay when the speed variation is larger than a predetermined value. The value of this opposing magneto-motive force will thus be so determined that the voltage increase in the generator 1, caused by said speed variation, gives rise to an increase in the magneto-motive force which compensates said opposing magneto-motive force. The result will be that for a speed increase higher than said variation, the relay 2 will remain closed in spite of the switch 20 being closed. The control 27 will act in a continuous manner. It will be periodically interrupted only when the speed becomes close to the value to be maintained. The danger of oscillations will again appear and the interruptions in operation will again act to oppose it.

The auxiliary winding 9 of the relay 6 generates, when energized, a magneto-motive force in the same direction as the magneto-motive force in the winding 7, and, consequently, as the resultant of the magneto-motive forces in the winding 7 and 8, within the limits of utilization of the regulator. The flux through the magnetic circuit of this relay 6 will so be increased during the closure of the switch 20, contrary to this of the relay 2. Nevertheless, the flux variation so caused is alike to the variation caused by the winding 5 to the flux through the magnetic circuit of the relay 2. This flux variation in the relay 6 has the effect concurrently with the flux variation in the relay 2 to check the operation of the relay 6, therefore, the opening control of the electric contact 25, when the speed variation remains lower than a value which is the same as for the relay 2, but now, when the speed value becomes lower than its value to be maintained.

The magneto-motive force in the winding 3 is partly balanced by that in the winding 4, as the magneto-motive force in the winding 7 is balanced by that in the winding 8. The sensitivity of the relays with respect to the current delivered by the generator will thus be considerably increased.

Assume that the mean value of the generator voltage is 100 volts, and that the constant voltage at the terminals of the differential windings is 80 volts. By virtue of the proportionality of the fluxes with the supply voltages, everything would take place as if the two relays were supplied with 100—80=20 volts. If the relay sensitivity is ±1% (a common value for precision type relays), it will be seen that the voltage variation necessary for operating each one of the two relays in the case under consideration will be ±0.2 volt. This voltage variation, referred to the voltage of the current delivered by the generator and consequently to the speed of the moving element, gives a precision of ±0.2%.

One can conceive that by varying the difference between the voltage of the generator and the constant voltage of the differential windings, it is possible to adjust at will the relay sensitivity. The adjustable resistance 15 which is the sensitivity adjusting resistance, is mounted in shunt across the terminals of the windings 4 and 8 and makes it possible, by varying the value of the constant voltage, at the terminals of said windings, to adjust said difference to its optimum value.

Finally, the current source 18 delivers current to the circuit comprising the two auxiliary windings 5 and 9 connected in parallel and the adjustment resistance 21. The constancy of the supply voltage is ensured, as in the previous case, by an iron-hydrogen lamp 19 connected in series in the circuit, which is cut-off and re-established at regular intervals by a rotary switch 20 or another device such as a chattering relay or a bi-metallic element.

The auxiliary winding 5 of the relay 2 being wound in an opposite direction to that of the main winding 3, the flux it generates opposes that produced by said winding and is in the same direction as that produced by the winding 4.

On the contrary, the auxiliary winding 9 being in the same direction as the main winding 7, the flux it generates is in the same direction as that generated by the winding 7 and in opposite direction to the flux produced by the winding 8.

The contact 24, associated with the movable armature of the relay 2 closes, when this relay operates, the supply circuit for the control elements for the mechanism 27, causing the decrease in speed of the element driving the generator, and the contact 25, associated with the movable armature of the relay 6 closes, when said relay releases, the supply circuit for the control elements for the mechanism causing the increase in speed. When the moving element rotates at the desired speed, the relay 2 is permanently released and the periodic impulses (of the flux generated by the intermittent current) sent by the switch 20 do not tend to cause its operating, since they are in opposition to the electro-magnetic stress resulting from the two windings 3 and 4. The contact 24 is thus at the rest position and the speed decreasing circuit is open. In the same conditions, the contact 25, controlled by the relay 6 remains permanently operated and the impulses due to the intermittent current do not tend to release it since they are in the same direction as the electro-magnetic stress resulting from the two windings 7 and 8.

When, due to a cause outside the system, the speed increases, a time is reached when, the winding 5 not being energized, the variable electro-magnetic action (resulting from the windings 3 and 4) causes the pulling in toward the left of the movable armature and the closing of the contact 24. At the next emission of intermittent current, the flux generated by the winding 5, which is in opposite direction to the resultant of the fluxes generated by the windings 3 and 4, will cause the releasing of the relay when the contact 24 opens. At the next interruption of the intermittent current, the relay will again operate, and so on. There will thus be produced an intermittent operation of the relay 2 and, consequently of the control elements for speed reduction, as long as the difference between the variable electromagnetic force and the electromagnetic force developed by the auxiliary winding is less than the electromagnetic force necessary for the operation of the relay.

The operation of the relay 6 is substantially similar:

When the speed decreases, for a reason outside the system, a time is reached when the winding 9 not being energized, the variable electromagnetic force (resulting from the windings 7 and 8) is no longer sufficient to hold the relay operated. The relay releases. At the next emission of intermittent current, the electromagnetic force of the winding 9 will cause the return of the movable armature and the re-operating of the relay. At the next cutting off of the intermittent current, the relay will again release, and so on. There will be thus an intermittent operating of the relay 6 and consequently of the elements controlling the speed increase, as long as the sum of the variable electromagnetic force and the electromagnetic force of the winding 9 is greater than the operating force of the relay.

The mechanical elements acting on the speed being controlled by the relays 2 and 6 by means of contacts 24 and 25, it is obvious that the speed correction will be effected by a discontinuous action in the vicinity of the desired value and by a persistent action in case of larger speed deviations.

The desired rate is obtained by acting on the slide of the adjustment resistance 10, or "speed regulating resistance" since this modifies the value of the speed corresponding to the operating and releasing voltages of the relays 2 and 6 respectively.

Similarly, the range of the intermittent operating zone can be modified for each one of the relays by acting on the adjustable resistance 21, or "deviation adjusting resistance" inserted in the circuit for the intermittent current.

It will be noted that in the intermittent operation range of the regulator which is the object of the invention, the times of operation and release of the relays 2 and 6 are equal to the times of flow and interruption of the intermittent current, or vice versa, according to the type of relay, i. e. all periods of operation or release are respectively equal to one another over the whole range of intermittent operation.

With a view to reducing further the risks of hunting in the vicinity of the equilibrium position of the system, the regulator according to the invention may be operated by supplying the auxiliary windings 5 and 9 of Figure 1 no longer with a direct current of constant intensity but with a waveform current increasing gradually from zero to a maximum value and then decreasing gradually from this value to zero. In the latter case, the duration of the intermittent periods during which relays 2 and 6 are closed and released respectively varies directly with the magnitude of the positive and negative speed deviations until the limit of the intermittent operating range of deviations is reached, whereupon relay 2 or relay 6 is closed or released, respectively, in a continuous manner. For an example, when a deviation of the speed and the direct current supply proportional thereto approaches very near to the positive limit of said intermittent operating range, the magnetomotive force exerted by winding 5 tending to open relay 2 is sufficient to overcome the resultant magnetomotive force windings 3 and 4 exerted in the opposite direction for only a brief period when the waveform current applied to windings 5 and 9 is near its peak or maximum value.

It is obvious that the invention cannot be limited to this last mode of embodiment, but that any other means may be used for varying the duration of the action of the device making it possible to effect in the value of the control flux for the relay the modification, in a constant direction, for intermittently opposing the operation of the relay.

Figure 2 shows a means for effecting the continuous variation of the electromagnetic force generated by the auxiliary windings by using relays, the magnetic circuit of which comprises a core and a counter-core 29. In these relays, the action of the auxiliary windings is replaced by the action of the counter-core 29 which is permanently driven with a reciprocating translation motion. This reciprocating motion may be caused, for instance, by an eccentric 30 imparted a uniform rotation motion.

In the case of the speed decreasing relay (relay 2) shown in Figure 2, the first operation will take place during the speed increase, at the time when the air gap is at its minimum value. The releasing of the relay will take place at the time of the back motion of the core, by an increase in the air gap when the counter-core is moved away from the core. The variable electromagnetic force $F_{v2}$ increasing with the speed, a time will be reached when the relay will no longer release even when the air gap is at its maximum value, the variations in the air gap being substantially sinusoidal due to the driving of the counter-core by the eccentric 30, it will be understood that between the time of the first operating and the time when the relay no longer releases, i. e. during the whole range of intermittent action, the durations of the operating periods will increase in accordance with the speed, since the releasing will take place with wider and wider air gaps, and since the width of the air gap is a function of the distance through which the cam moves, and therefore a function of time.

Obviously the same holds for the speed increase relay, with this difference that the release periods will then decrease as a function of the speed.

Finally, for decreasing to a maximum extent the response delay of the regulator in case of sudden speed deviations, the regulator is provided with an electrical element sensitive to positive or negative accelerations for controlling, in parallel with the regulator, the control circuits for the speed varying mechanisms.

Figure 3 shows, very schematically, the regulator which is the object of the invention provided with such an element which, by way of example, consists of an unsaturated transformer 31, through the primary winding of which flows the current delivered by the generator. The secondary winding may deliver current in a circuit comprising two relays 32 and 33. A rectifier cell element is connected in series with each relay. These two elements being connected in opposite directions, the result is that according to the direction in which the current flows in the secondary circuit of the transformer, one or the other relay is energized and only one of them at one time. Thus a sudden variation of the current from the generator will cause, in the secondary of the transformer an induced current, the direction of flow of which will be a function of the direction of the acceleration, which current, in turn will cause the operating of one of the two relays 32 and 33. The relays 32 and 33 can, by means of the contacts in parallel with the contacts 24 and 25, close the control circuits for the speed varying mechanisms, and it will be seen that in case of a large acceleration, the speed correction will take place instantaneously and in a continuous manner until the time when the acceleration having dropped to a lower value, the action of the transformer will cease to allow the regulator to continue its operation normally. It is evident that the regulator provided with the element of Figure 3 is particularly adapted to continuously correct for deviations having a rate of change in excess of a predetermined value but occurring within the normally intermittent operating range of the regulator.

What is claimed is:

1. A regulator for maintaining the speed of a machine close to a predetermined operating point comprising, speed decreasing means coupled to said machine and having a first actuating circuit coupled thereto, a first relay having a speed responsive winding and an opposing biasing winding, a core magnetically coupled to said windings, and an armature operatively connected to said actuating circuit in controlling relationship, speed increasing means coupled to said machine and having a second actuating circuit coupled thereto, a second relay having a speed responsive winding and an opposing biasing winding, a core magnetically coupled to said speed responsive and said biasing windings, an armature operatively connected to said second actuating circuit in controlling relationship, an adjustable direct current source coupled to each of said biasing windings, magnetomotive force pulsing means coupled to each of said cores, and a direct current speed responsive direct current generator connected in driven relationship with said machine and having an output circuit, said output circuit connected to each of said speed responsive windings, whereby said pulsing means is of such a magnitude that for speeds in a narrow range above said predetermined operating point said pulsating means intermittently overcomes in said first relay the resultant magnetomotive force of said biasing and said speed responsive windings, causing intermittent actuation of said machine speed decreasing means beyond which range magneto-motive force of said speed responsive winding exceeds the resultant of said biasing winding and said pulsing means rendering said speed decreasing means continuously actuated, and for speeds in a narrow range below said operating point said speed increasing means is rendered intermittently operative by said pulsing means beyond which range said speed increasing means is rendered continuously operative by the resultant of said speed responsive winding and said biasing winding overcoming the effect of said pulsing means.

2. A regulator as claimed in claim 1 wherein said magnetomotive force pulsing means comprises, a first pulsing winding magnetically coupled to said first relay core in magnetic opposition to said speed responsive winding, a second pulsing winding magnetically coupled to said second relay core in magnetic addition to said speed responsive winding, a source of pulsating unidirectional current, and an output circuit coupled to said pulsating source and to said first and second pulsating windings for maintaining a pulsating flux in said first and second cores.

3. A regulator as claimed in claim 1, wherein said first and second cores comprise a first main core connected to said first armature and a first counter core in said first relay, a second main core connected to said second armature and a second counter core in said second relay, and said magnetomotive force pulsing means comprises mechanical means for reciprocating said first and said second counter cores.

4. A regulator as claimed in claim 1 having an acceleration control circuit comprising, a transformer having a primary and a secondary winding, said primary connected to said direct current generator output circuit, a first and a second rectifier connected to said secondary in parallel relationship of opposed polarity, a first and a second acceleration responsive relay each having a winding, a core, and an armature, said first and said second acceleration responsive relay windings connected in series with said first and said second rectifiers respectively, a parallel circuit connected to said speed decreasing actuating circuit and adapted to be closed by the actuation of said first acceleration responsive relay, a parallel circuit connected to said speed increasing means and adapted to be closed by said second acceleration responsive relay wherein a sudden increase in speed actuates said first acceleration control relay and a sudden decrease in speed actuates said second acceleration control relay.

References Cited in the file of this patent

UNITED STATES PATENTS

| Number | Name | Date |
|---|---|---|
| 1,673,718 | Thompson | June 12, 1928 |
| 1,717,293 | Winter | June 11, 1929 |
| 2,254,039 | Kovalsky | Aug. 26, 1941 |